UNITED STATES PATENT OFFICE.

ARNOLD RAHTJEN AND CARL STEPHAN, OF HAMBURG, GERMANY; SAID STEPHAN ASSIGNOR TO SAID RAHTJEN.

PROCESS OF MAKING INDIGO.

No. 850,444.     Specification of Letters Patent.     Patented April 16, 1907.

Application filed January 29, 1906. Serial No. 298,556.

*To all whom it may concern:*

Be it known that we, ARNOLD RAHTJEN, chemist, residing at 19 Mittelweg, Hamburg, Germany, and CARL STEPHAN, chemist, of 14 Brahams Allee, Hamburg, Germany, subjects of the Emperor of Germany, have invented certain Improvements in Processes of Making Indigo; and we do hereby declare the nature of our invention to be as follows.

We have discovered that artificial indigo is obtained when $\alpha$-isatin anilid, dissolved or suspended in a suitable solution, is treated with hydrogen sulfid, ($H_2S$.)

Our invention consists in a process of making indigo in which this discovery is utilized.

In the practice of our process the $\alpha$-isatin anilid is dissolved or suspended in any suitable alkaline or neutral liquid, ethyl alcohol being well adapted for this purpose. Hydrogen sulfid is then added. Indigo is not in all cases immediately produced upon the addition of the hydrogen sulfid. Sometimes intermediate products result which may be isolated, although that is not necessary for the successful practice of our process. These intermediate products change into indigo so easily that the application of heat results in the immediate production of indigo. At a lower temperature the intermediate products, dissolved or suspended in suitable liquids which contain an excess of hydrogen sulfid, change into indigo gradually; but the process can be carried out by adding reagents, as hereinafter illustrated. The anilid split off is easily regained and the separated sulfur is separated from the indigo in the usual manner.

The following examples illustrate various methods in which my invention can be successfully carried out.

Example 1: Ten parts, by weight, of $\alpha$-isatin anilid are dissolved in thirty or forty parts of alcohol. Then introduce hydrogen sulfid ($H_2S$) at ordinary temperature until the liquid is almost colorless. Then add water and precipitate the indigo by blowing air into the resulting mixture.

Example 2: Proceed as under Example 1, but instead of blowing in air increase the temperature gradually up to 50° to 80° Celsius, whereupon the indigo separates out.

Example 3: Treat a solution of $\alpha$-isatin anilid as under Example 1, but instead of blowing in air add nitric, sulfuric, or any other suitable acid, whereupon the indigo separates out.

Example 4: Treat the solution of $\alpha$-isatin anilid as under Example 1 with hydrogen sulfid ($H_2S$) and add traces of ammonia, soda, and such like agents, whereupon indigo separates out.

Example 5: Into a boiling solution of $\alpha$-isatin anilid in pure or diluted alcohol or in aceton, benzol, or like suitable liquids hydrogen sulfid ($H_2S$) is introduced until the liquid is almost colorless, whereupon crystallized indigo separates out.

Example 6: Suspend $\alpha$-isatin anilid in water in which traces of alkali are preferably dissolved, introduce hydrogen sulfid and heat the liquid from 25° to 100° Celsius. Indigo in the form of a very fine powder is thus produced.

Having thus described an invention, what we claim, and desire to secure by Letters Patent, is—

1. In a process of producing indigo, reacting upon $\alpha$-isatin anilid with hydrogen sulfid.

2. In a process of producing indigo, passing hydrogen sulfid into a liquid containing $\alpha$-isatin anilid.

3. In a process of producing indigo, passing hydrogen sulfid into liquid holding $\alpha$-isatin anilid in suspension.

4. In a process of producing indigo, passing hydrogen sulfid into alcohol containing $\alpha$-isatin anilid.

5. In a process of producing indigo, reacting upon $\alpha$-isatin anilid with hydrogen sulfid and subjecting the intermediate products thus formed to heat.

6. In a process of producing indigo, reacting upon $\alpha$-isatin anilid with hydrogen sulfid and heating the resulting material until indigo is precipitated.

7. In a process of producing indigo, reacting upon α-isatin anilid with hydrogen sulfid in the presence of a liquid and heating the resulting material to a temperature of from 25° to 100° Celsius.

8. In a process of producing indigo, first reacting upon α-isatin anilid, suspended in alcohol, with hydrogen sulfid, heating the resulting material to a temperature of from 25° to 100° C. and separating the resulting precipitate from the remaining liquid.

Dated this 15th day of January, 1906.

ARNOLD RAHTJEN.
CARL STEPHAN.

Witnesses:
 ERNEST H. L. MUMMENHOFF,
 IDA CHRIST. HAFERMANN.